US006869475B1

(12) United States Patent
Krowl

(10) Patent No.: US 6,869,475 B1
(45) Date of Patent: Mar. 22, 2005

(54) CALCIUM SILICATE INSULATING MATERIAL CONTAINING BLAST FURNACE SLAG CEMENT

(75) Inventor: Thomas R. Krowl, Littleton, CO (US)

(73) Assignee: BNZ Materials, Inc., Littleton, CO (US)

( * ) Notice: Subject to any disclaimer, the term of this patent is extended or adjusted under 35 U.S.C. 154(b) by 0 days.

(21) Appl. No.: 10/695,522

(22) Filed: Oct. 28, 2003

(51) Int. Cl.[7] .......................... C04B 2/02; C04B 14/38; C04B 7/14

(52) U.S. Cl. .................. 106/797; 106/795; 106/796; 106/90; 106/93; 106/99; 106/104; 106/119; 106/600; 106/606; 106/624; 106/638; 106/697; 106/709; 106/713; 106/714; 106/120

(58) Field of Search ............................ 106/795, 796, 106/797, 90, 93, 99, 104, 119, 120, 600, 606, 624, 638, 697, 709, 713, 714

(56) References Cited

U.S. PATENT DOCUMENTS

| | | |
|---|---|---|
| 3,001,882 A | 9/1961 | Taylor |
| 3,227,570 A | 1/1966 | Bishop |
| 3,317,643 A | 5/1967 | Denny |
| 3,352,746 A | 11/1967 | Williams et al. |
| 3,679,446 A | 7/1972 | Kubo |
| 3,976,728 A | 8/1976 | Hawthorne |
| 4,015,040 A | 3/1977 | Yoshida et al. |
| 4,037,015 A | 7/1977 | Koike et al. |
| 4,101,335 A | 7/1978 | Barrable |
| 4,111,712 A | 9/1978 | Pusch |
| 4,128,434 A | 12/1978 | Pusch |
| 4,132,555 A | 1/1979 | Barrable |
| 4,144,121 A | 3/1979 | Otouma et al. |
| 4,298,386 A | 11/1981 | Kubo et al. |
| 4,334,931 A | 6/1982 | Asaumi et al. |
| 4,447,380 A | 5/1984 | Shannon et al. |
| 4,545,970 A | 10/1985 | Krijgsman |
| 4,647,499 A | 3/1987 | Takahashi et al. |
| 4,690,867 A | 9/1987 | Yamamoto et al. |
| 4,769,074 A | 9/1988 | Holcombe, Jr. et al. |
| 4,773,470 A | 9/1988 | Libby et al. |
| 4,775,505 A | 10/1988 | Kuroda et al. |
| 4,780,141 A | 10/1988 | Double et al. |
| 4,840,672 A | 6/1989 | Baes |
| 4,874,726 A | 10/1989 | Kleeb et al. |
| 4,885,203 A | 12/1989 | Wakat |
| 4,895,890 A | 1/1990 | Sawanobori et al. |
| 4,897,294 A | 1/1990 | Libby et al. |
| 5,073,199 A | 12/1991 | Krowl et al. |
| 5,242,649 A | 9/1993 | Yamamoto et al. |
| 5,340,513 A | 8/1994 | Koslowski et al. |
| 5,411,793 A | 5/1995 | Ide et al. |
| 5,491,020 A | 2/1996 | Ide et al. |
| 5,632,326 A | 5/1997 | Gough |
| 5,641,348 A | 6/1997 | Miller et al. |
| 5,641,584 A | 6/1997 | Andersen et al. |
| 5,654,048 A | 8/1997 | Andersen et al. |
| 5,656,195 A | 8/1997 | Mielke et al. |
| 5,830,548 A | 11/1998 | Andersen et al. |
| 5,858,083 A | 1/1999 | Stav et al. |
| 5,871,857 A | 2/1999 | Alhamad |
| 5,928,741 A | 7/1999 | Andersen et al. |
| 5,935,655 A | 8/1999 | Beleck |
| 5,935,699 A | 8/1999 | Barber |
| 5,944,888 A | 8/1999 | Perich et al. |
| 6,572,697 B2 | 6/2003 | Gleeson et al. |
| 6,620,487 B1 | 9/2003 | Tonyan et al. |

FOREIGN PATENT DOCUMENTS

| | | |
|---|---|---|
| CN | 1204678 | 1/1999 |
| CN | 1253924 | 5/2000 |
| CS | 266097 | 11/1989 |
| JP | 48085621 | 11/1973 |
| JP | 48085622 | 11/1973 |
| JP | 63074949 | 4/1988 |
| JP | 01298051 | 12/1989 |
| JP | 05310464 | 11/1993 |
| JP | 07278532 | 10/1995 |
| KR | 9511940 | 10/1995 |
| PL | 148353 | 10/1989 |

OTHER PUBLICATIONS

National Slag Association, Brochure with material information and case studies, 1997.

Primary Examiner—Elizabeth D. Wood
(74) Attorney, Agent, or Firm—Quinn & Quinn, P.C.; William J. Quinn; Cornelius P. Quinn

(57) ABSTRACT

An asbestos free, calcium silicate insulating material, suitable for use in applications where a tough, fire resistant, heat insulating, electrical insulating, and corrosion resistant material is desirable. The calcium silicate insulating material is produced by combining Portland cement, blast furnace slag cement, a siliceous component, wollastonite and organic fibrous material in the presence of water to form a slurry. The slurry is then placed under steam pressure, to react the portland cement, blast furnace slag cement, siliceous component and water, dried, and heat treated if necessary.

6 Claims, No Drawings

US 6,869,475 B1

CALCIUM SILICATE INSULATING MATERIAL CONTAINING BLAST FURNACE SLAG CEMENT

FIELD OF THE INVENTION

The present invention relates generally to improved portland cement based calcium silicate electrical and thermal insulating heat-resistant materials and methods of producing such materials; and more particularly, the present invention is directed toward improved calcium silicate materials containing blast furnace slag cement, and methods of making such materials, wherein the resulting materials produced are particularly suitable for use in electrical and mechanical insulation applications.

BACKGROUND OF THE INVENTION

A variety of insulating heat-resistant materials suitable for use in electrical and mechanical insulation are well known in the prior art. Of the insulating heat-resistant materials utilized in the process of casting metals that are known in the prior art, portland cement based calcium silicate materials have proven to be of particular utility.

A fundamental formulation and process for making calcium silicate insulating material is disclosed in U.S. Pat. Nos. 4,111,712 and 4,128,434 to Pusch. This fundamental calcium silicate insulating material is produced by combining, a source of calcium, such as hydrated lime or quick lime, a source of siliceous material, such as silica, diatomaceous earth, silica fume, colloidal silica, or other suitable oxides of silicon, fibrous wollastonite and an organic fiber, such as kraft made from wood pulp, in the presence of at least one part by weight water per part by weight of the forgoing combined materials, to form an aqueous slurry. The aqueous slurry is then poured into a mold where the excess water is pressed out of the mixture to form an uncured shape, typically a sheet. The uncured shape is then placed in an autoclave where it is heated under steam pressure of about 100 psi. Finally, the resultant calcium silicate insulating material is cut or machined to the appropriate dimensions for use in the particular application.

In producing a high density calcium silicate insulating material, portland cement has herebefore been utilized as the calcium source in the formulation. In high density calcium silicate insulating materials, it is desirable that the insulating material have high density, increased strength, good machining characteristics, and be homogeneous throughout with minimized thermal shrinkage. Of particular importance for calcium silicate insulating material utilized in connection with insulating electrical equipment is structural durability. In the past, asbestos fibers had been utilized as a reinforcing fiber in manufacture of calcium silicate insulating materials to provide sufficient strength and toughness to the insulating material. Although such asbestos containing insulating materials performed well, the use of asbestos fibers has been widely discontinued due to health and environmental concerns.

U.S. Pat. No. 5,073,199 to Krowl et al. discloses a calcium silicate insulating material containing pitch based graphite fiber to provide toughness and strength to the insulating material. However, the incorporation of such graphite fiber and its associated material cost results in an appreciable increase in the cost of the resultant product.

Accordingly, it is the principle objective of the present invention to provide an electrical insulating material that is suitable for use in electrical insulating applications with greater refractoriness, is tough and resistant to high temperature cracking, and does not possess the shortcomings of the prior art insulating materials.

An additional objective of the present invention is to provide a tough asbestos-free fire resistant, heat insulating, electrical insulating, and corrosion resistant material, that may be utilized in other applications, such as metal casting, having reduced health exposure risk and minimal environmental impact.

Other objects and advantages of the present invention will be apparent to those skilled in the art from the following description of the invention.

SUMMARY OF THE INVENTION

The present invention is an asbestos-free electrical and mechanical insulating material that is resistant to high temperature cracking that is formed from a mixture consisting essentially of, in parts by weight percentage: 5 to 28 weight percent of portland cement, 15 to 40 weight percent of blast furnace slag cement, 0 to 70 weight percent of wollastonite, 2 to 15 weight percent of silica fume, and 0 to 10 weight percent of organic fiber, in the presence of at least one part by weight water per part by weight of the combined materials of the mixture other than water, to form an aqueous slurry; molding the aqueous slurry into a shape and expelling excess water; curing the molded shape under appropriate steam pressure for sufficient time to cause the portland cement, blast furnace slag cement, silica component and water to react to form the calcium silicate structure reinforced by the wollastonite, if present; thereafter, the cured shape is dried, and machined to particular shape, if desired.

DETAILED DESCRIPTION OF THE INVENTION AND PREFERRED EMBODIMENTS

The principal components of the present invention are blast furnace slag cement, portland cement, a siliceous component, wollastonite, if desired, and a small amount of organic fiber, if desired.

The amount of portland cement utilized by weight is from 5 to 28 percent, and preferably 7 to 12 percent, of the total weight of the components other than water.

The amount of blast furnace slag cement utilized by weight is from 15 to 40 percent, and preferably from 20 to 35 percent, of the total weight of the components other than water.

The siliceous component utilized may be of any substantially pure sources of silica such as silica, diatomaceous earth, silica fume, colloidal silica, or other suitable oxides of silicon. The amount of siliceous component utilized by weight is from 2 to 15 percent, and preferably from 5 to –10 percent, of the total weight of the components other than water. The portland cement and siliceous component are utilized in a ratio suitable for the calcium silicate structure formation under appropriate conditions.

Wollastonite is a crystalline form of anhydrous calcium silicate. In the present invention, the wollastonite, if used, preferably has a particle size whereby 60 weight percent of its particles pass through a sieve no. 50 mesh screen. The wollastonite, if used, is up to 70 percent, and preferably from 30 to 50 percent, of the total weight of the components other than water.

An organic fiber may be incorporated to facilitate the handling and molding of the insulating material of the present invention and to provide green strength in the process of manufacture. The amount of organic fiber utilized is up to 10 percent, and preferably from 4 to 8 percent, of the total weight of the components other than water. The organic fiber may be wood fiber, polyester or other synthetic fiber, cotton or other natural fibers. Kraft, which is made from wood pulp is particularly preferred.

To form a calcium silicate insulating material of the present invention, the blast furnace slag cement, the portland cement, the siliceous material, the wollastonite, and the organic fiber, if utilized, are mixed in the presence of at least one part by weight water per part by weight of the blast furnace slag cement, portland cement, siliceous material, wollastonite and organic fiber of the mixture to form an aqueous slurry. Mixing occurs with such vigor and for such time as is necessary to thoroughly disperse the dry solid materials throughout the slurry. The aqueous slurry is then placed into a mold where excess water is pressed from the aqueous slurry to form a shape retaining molded body. A typical shape of the molded body is a flat 4 foot by 8 foot sheet about ½ to 3 inches thick. The molded body is then cured under high pressure steam for such time and at such pressure as necessary cause the blast furnace slag cement, portland cement, siliceous material and water to form the calcium silicate structure. Steam pressure of about 100 psi for a period of about 18 to 22 hours is employed; however other variations of time and steam pressure which are known in the art may be employed.

The cured body may then be oven dried to about 250 degrees Fahrenheit to reduce its moisture content.

Some of the beneficial properties of the insulating material of the present invention are illustrated by way of the following non-limiting comparative examples. In each of the following examples, calcium silicate insulating materials of particular component formulations were prepared as follows:

The components were mixed in the presence of water, which was utilized in an amount greater than one part by weight of water per part by weight of the components other than water, to form an aqueous slurry.

The aqueous slurry was then transferred into a mold and pressed to 700 psi, where the excess water was pressed from the aqueous slurry to form a green state flat sheet with the dimensions of 4 feet by 8. To ensure validity of comparison, test samples within each comparative example were pressed within the same mold and press.

The molded sheet was then cured under steam pressure of 100 psi for 24 hours.

The cured sheet was then oven dried to 250 degrees Fahrenheit until it reached an equilibrium moisture constant.

COMPARATIVE EXAMPLE 1

The following table sets forth a comparison of performance parameters between a portland cement based calcium silicate board of the prior art and a calcium silicate board of the present invention formulated with blast furnace slag. The table indicates the measured density, modulus of rupture (bending strength) and calculated strength factor of the respective boards after exposure to elevated temperatures of 600 degrees Fahrenheit for 24 hours and 1000 degrees Fahrenheit for 24 hours. The prior art test samples, numbered 1 and 3, were prepared with a formulation expressed in weight percent of the total components, other than water of, 43 percent wollastonite, 43 percent portland cement, 8 percent silica fume, and 6 percent kraft. The test sample of the present invention, numbered 2 and 4, were prepared with a formulation expressed in weight percent of the total components, other than water of, 43 percent wollastonite, 33 percent blast furnace slag cement, 10 percent portland cement, 8 percent silica fume, and 6 percent kraft.

An important performance criterion for calcium silicate insulating material utilized in electrical and mechanical insulating applications is its modulus of rupture (bending strength). A significant and unanticipated benefit of the calcium silicate insulating material produced from the formulation of the present invention incorporating blast furnace slag cement is its retention of bending strength after exposure to operating temperatures in the range of 600 degrees Fahrenheit to 1000 degrees Fahrenheit.

Consistently, a higher density material will yield a higher modulus of rupture. To properly evaluate the strength characteristics of materials with different densities, a formula is employed to normalize the impact of variation in density; a strength factor, which normalizes this variation and allows comparisons to be made, is equal to the modulus of rupture (bending strength) divided by the density squared.

| COMPARATIVE EXAMPLE 1 TABLE | | | | |
| --- | --- | --- | --- | --- |
| test sample number | 1 | 2 | 3 | 4 |
| blast furnace slag cement (in weight percent) | 0 | 33 | 0 | 33 |
| temperature of exposure (in degrees Fahrenheit) | 600 | 600 | 1000 | 1000 |
| density (in lbs/ft$^3$) | 96.5 | 96.7 | 98.3 | 96.9 |
| modulus of rupture (bending strength in psi) | 1437 | 2678 | 1084 | 2403 |
| strength factor (MOR/D2) | .15 | .29 | .11 | .26 |

From the table in this comparative example, it can be observed that the calcium silicate boards of the present invention that are formulated with blast furnace slag cement are generally two times stronger than the prior art calcium silicate boards formulated without the blast furnace slag cement.

COMPARATIVE EXAMPLE 2

In this comparative example, a prior art calcium silicate material test sample, is compared to a calcium silicate test sample of the present invention formulated with blast furnace slag cement. The test samples from a 1 inch thick sheet were cut to dimensions of 2 inches by two 2 inches; and the sheets were prepared in the same fashion and with the identical formulations to the sheets prepared in comparative example 1 above. The test samples were each then compressed in a press at a constant rate until failure.

An additional important performance criterion for calcium silicate insulating material utilized in certain applications is its compression strength. In applications such as for induction furnace insulation and casting with platen presses, increased compressive strength is desirable.

In this comparative example, the test sample of the present invention formulated, with blast furnace slag, withstood compression to failure up to 13,000 psi, while the prior art test sample, formulated without blast furnace slag withstood compression to failure only up to 10,000 psi.

What is claimed is:

1. A calcium silicate insulating material formed from a mixture comprising: 5 to 28 weight percent portland cement, 15 to 40 weight percent blast furnace slag cement, and 2 to 15 weight percent of siliceous component, all slurried in at least one part by weight water per part by weight of said mixture.

2. A calcium silicate insulation material as in claim 1, wherein said mixture further comprises up to 10 weight percent organic fiber.

3. A calcium silicate insulation material as in claim 1, wherein said mixture further comprises up to 70 weight percent wollastonite.

4. A calcium silicate insulation material as in claim 2, wherein said mixture further comprises up to 70 weight percent wollastonite.

5. A calcium silicate insulating material as in claim 3, wherein the amount of said blast furnace slag cement of said mixture is 20 to 35 weight percent, the amount of said siliceous component of said mixture is 5 to 10 weight percent, the amount of said portland cement of said mixture is 5 to 10 weight percent, and the amount of said wollastonite is 30 to 50 weight percent.

6. A calcium silicate insulating material as in claim 4, wherein the amount of said blast furnace slag cement of said mixture is 20 to 35 weight percent, the amount of said siliceous component of said mixture is 5 to 10 weight percent, the amount of said portland cement of said mixture is 5 to 10 weight percent, the amount of said wollastonite is 30 to 50 weight percent and the amount of said organic fiber is 4 to 8 weight percent.

* * * * *